Figure 1:
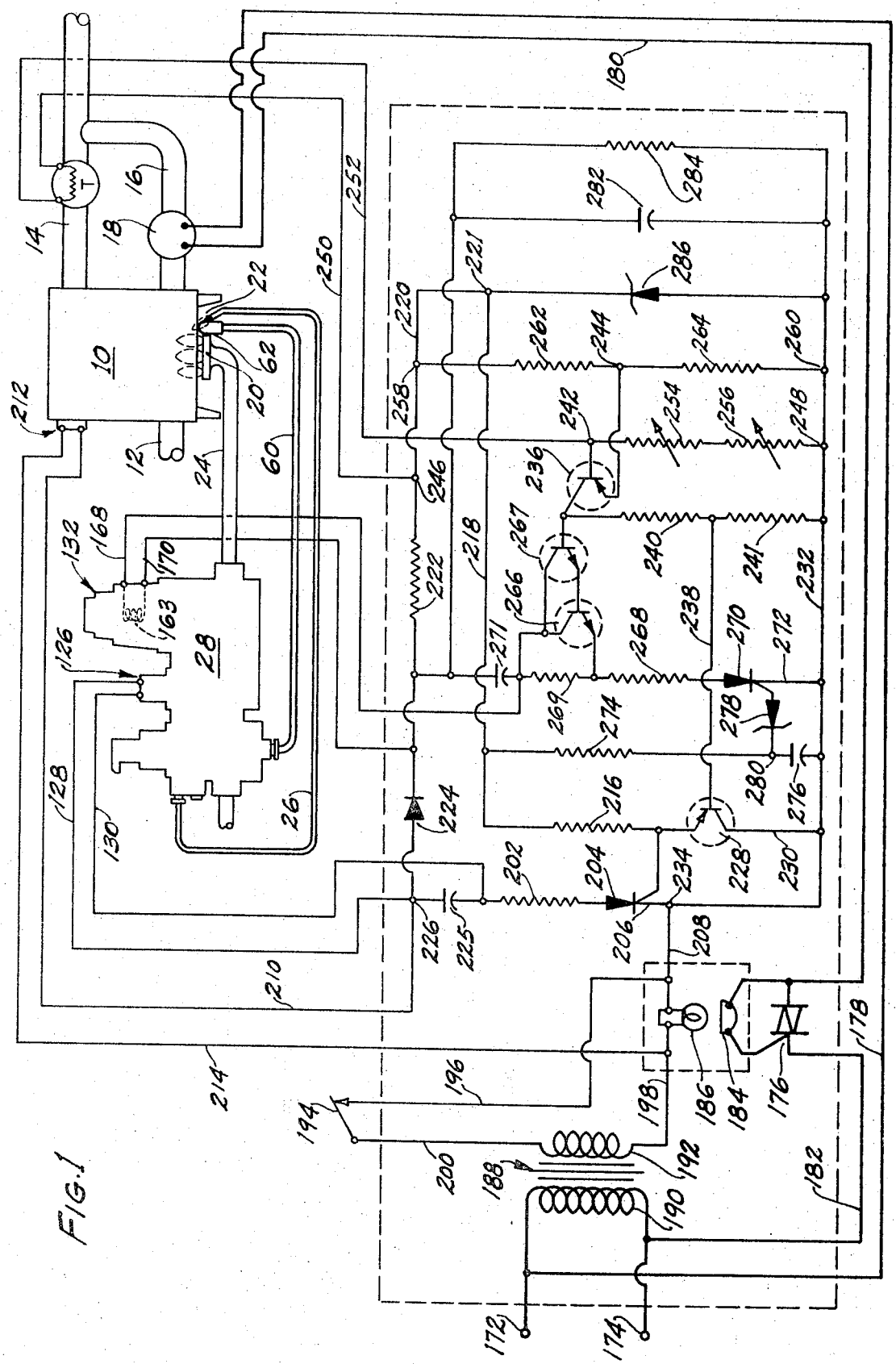

United States Patent [19]
Baysinger

[11] 3,843,049
[45] Oct. 22, 1974

[54] BURNER CONTROL SYSTEM
[75] Inventor: Robert L. Baysinger, St. Louis, Mo.
[73] Assignee: Emerson Electric Co., St. Louis, Mo.
[22] Filed: Dec. 13, 1973
[21] Appl. No.: 427,019

[52] U.S. Cl............ 236/1 E, 236/20, 236/84, 251/26, 307/39, 307/310, 317/139
[51] Int. Cl............ F23n 1/08, G05d 23/24
[58] Field of Search......... 236/218, 20, 80, 84, 1 E; 307/39; 251/30, 26

[56] References Cited
UNITED STATES PATENTS
| | | | |
|---|---|---|---|
| 3,307,785 | 3/1967 | Currie | 236/80 |
| 3,486,732 | 12/1969 | Freeby et al. | 251/75 |
| 3,603,504 | 9/1971 | Stang, Jr. | 236/84 |

*Primary Examiner*—William E. Wayner
*Attorney, Agent, or Firm*—Charles E. Markham

[57] ABSTRACT

A manifold gas valve for a water heater burner has a biased closed main valve which is opened by fluid pressure and an electrically operated auxiliary valve which controls the application of operating pressure to open the main valve. A variably biased pressure regulator regulates the valve operating pressure in accordance with the bias thereon and thereby varies the throttling position of the main valve. A solenoid is operative to variably bias the regulator in accordance with the rate of current flow through its winding, and an electrical control circuit including a sensing thermistor and amplifying means effects opening of the auxiliary valve when the water temperature drops any amount below a temperature selected to be maintained and operates to vary the current flow through the solenoid winding in accordance with water temperature variations through a range extending below a predetermined drop in temperature.

12 Claims, 2 Drawing Figures

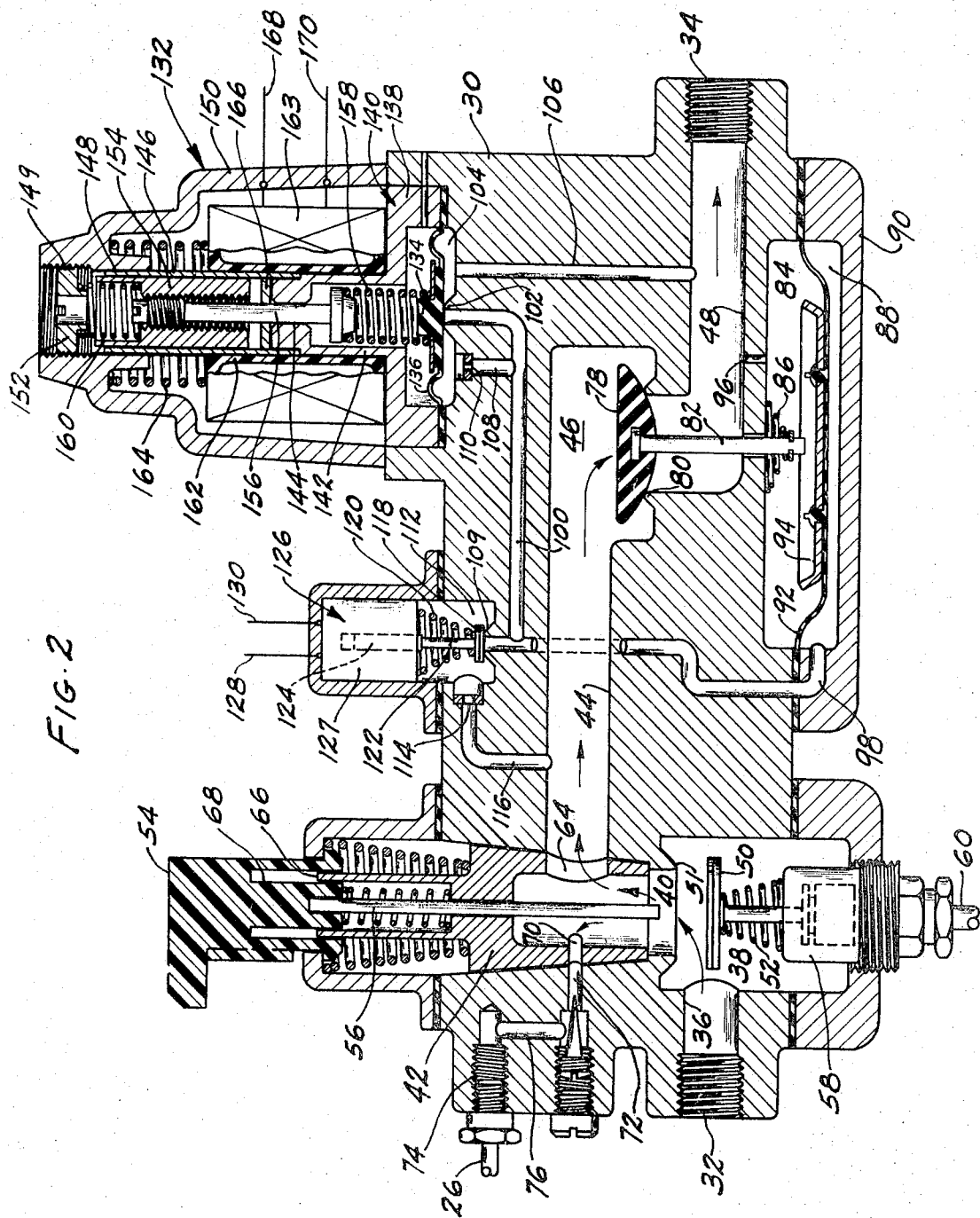

BURNER CONTROL SYSTEM

This invention relates generally to control systems for gas burners wherein the rate of gas flow to the burner is varied in accordance with heat output requirements. More particularly, the invention relates to a burner control system of this kind which responds quickly and accurately to relatively large and rapid changes in heat output requirements to vary the fuel flow rate to the burner.

Controlling the rate of gas flow to a water heater burner in accordance with heat output requirements to maintain a preselected water temperature is usually accomplished with a thermostatic device responsive to changes in the water temperature and directly or indirectly connected to the gas valve. While this type of control functions quite satisfactorily in most applications, its response time is too slow to follow the rapid and frequently large changes in water temperature which occur in the operation of some water heaters and space heating boilers.

For example, in commercial dishwashing systems wherein hot water is supplied in the dishwashing apparatus by water heaters of the so-called "instantaneous" type, variations in the heat output requirements due to variations in hot water drawoff are frequently quite large and may occur rapidly. Moreover, the temperature of the water supplied must be high enough to meet sterilization requirements and yet must not exceed a safe high limit which is about 20° F. higher. It will be appreciated, therefore, that the means controlling burner operation in such systems must respond quickly and accurately to water temperature variations, not only to quickly supply additional fuel when required but also to quickly cut back the fuel supply.

The primary object of the invention is to provide a generally new and improved control system which responds quickly and accurately to vary the gas input to a burner in accordance with relatively large and rapid changes in burner heat output requirements.

A further object is to provide a control system for gas burners operating through a wide range of heat output requirements to supply gas to the burner in accordance with heat output demands, but which limits gas flow to the burner to a predetermined rate of flow for a short period of time following initiation of burner operation, irrespective of the instant demand, so as to prevent flame roll-out, which may otherwise occur due to lack of sufficient initial flow of combustion air.

A further object is to provide a control system for gas burners operating through a wide range of heat output which supplies gas to the burner in an "on" and "off" manner at a relatively low predetermined rate to meet heat output requirements extending through a lower portion of the burner operating range and supplies fuel to the burner constantly at rates proportionate to the heat output requirements extending through an upper portion of the burner operating range.

More specifically, it is an object to provide a control system for gas burners in which a biased closed, fluid pressure opened gas valve device includes a pressure regulator regulating the operating pressure acting to open the valve, which regulator is variably biased so as to vary operating pressure and, therefore, the throttling position of the gas valve; in which a solenoid is operative to vary the regulator bias in accordance with the rate of current flow through its winding; and in which a temperature variable resistor is responsive to the temperature of a body or fluid heated by the burner to vary the current flow through the solenoid winding.

Further objects and advantages will appear from the following description when read in connection with the accompanying drawings.

In the drawings:

FIG. 1 is a diagrammatic illustration of a burner control system constructed in accordance with the invention, shown in connection with a gas-fired water heater; and FIG. 2 is a cross-sectional view of the fluid pressure operated manifold gas valve employed in the control system.

Referring to FIG. 1 of the drawings, a water heater is generally indicated at 10. The water heater has a cold water supply conduit 12 and a hot water outlet conduit 14. The water heater further includes a heat exchange coil (not shown) to one end of which outlet conduit 14 is connected. A bypass conduit 16 has one end connected to outlet conduit 14 and its other end connected to the heat exchange coil so that water may be circulated through a loop including the coil when no water is being drawn off through outlet 14. A pump 18 is interposed in bypass conduit 16 to effect this circulation. The water heater 10 further includes a main gas burner 20 and a pilot burner 22. Gas is supplied through main and pilot burner fuel conduits 24 and 26, respectively, under control of a manifold gas valve generally indicated at 28.

DESCRIPTION OF MANIFOLD GAS VALVE

Referring to FIG. 2 of the drawings, the manifold gas valve device 28 comprises a main body member 30 having an inlet 32 for connection to a source of gas supply under pressure and an outlet 34 to which main burner supply conduit 24 is connected. Inlet 32 and outlet 34 are connected by a passageway 36, a chamber 38, a passageway 40, a hollow rotary plug cock 42, a passageway 44, a chamber 46, and a passage 48.

A safety cutoff valve 50 cooperates with a seat 51 at the lower end of passageway 40 to cut off flow in the absence of pilot flame. The valve 50 is biased closed by a spring 52 and is manually set in an open position by depressing a knob 54 having a depending pin 56 which engages valve 50. The valve 50 is held open by an electromagnet 58 energized through leads 60 by a thermocouple junction 62 heated by the pilot burner 22, see FIG. 1. The hollow plug valve has a main port 64 in the wall thereof which registers with passageway 44 when the hollow plug valve is rotated to an "on" position. The knob 54 is axially slidable on plug valve 42 on circularly spaced, axially extending tangs 66 which enter sockets 68 in the knob. The knob 54 is thereby keyed to the plug valve for rotation therewith.

Plug valve 42 is further provided with a small circumferentially extending pilot port 70 in the wall thereof, which port registers with a passageway 72 when the plug valve is in an "on" position and also when the plug valve is rotated to a "pilot light" position in which port 64 is closed with respect to passage 44. Passage 72 is connected to pilot outlet 74 by a passage 76, and the pilot burner supply conduit 26 is connected to pilot burner outlet 74.

A main valve 78 cooperates with a valve seat 80 formed in chamber 46 and controls the flow from inlet 32 to main burner outlet 34 in accordance with heat output requirements. Valve 78 has a stem 82 extending downward into an upper diaphragm chamber 84 formed as a recess in body 30, and a spring 86 biases valve 78 downward to a closed position on its seat 80. A lower main diaphragm chamber 88 is formed by a cup-shaped member 90 attached by suitable means to body 30. A flexible main diaphragm 92 is clamped at its periphery between body 30 and member 90 and forms a flexible wall between upper and lower main diaphragm chambers 84 and 88. Main diaphragm 92 includes a rigid disc 94 centrally positioned and attached thereto. The disc 94 provides weight to bias the diaphragm in a downward position spaced from the end of valve stem 82.

The upper main diaphragm chamber 84 is adequately vented to outlet passage 48 through a vent 96, so that the upper side of main diaphragm 94 is constantly exposed to the pressure existing in outlet passage 48. Communication between the lower main diaphragm chamber 88 and outlet passage 48 is also provided through a passage 98, a passage 100, a valve seat 102, a chamber 104, and a passage 106. This communication is controlled by a pressure regulator which will later be described. Constant but restricted communication between diaphragm chamber 88 and outlet passage 48 is also provided by a bypass passage 108 including a restricting orifice 110 leading from passage 102 to chamber 104 and bypassing the valve seat 102.

Communication between lower main diaphragm chamber 88 and inlet 32 is provided through the passage 98, a valve seat 109, a valve chamber 112, a restricting orifice 114, a passage 116, the main passage 44, main port 64, hollow plug valve 42, passage 40, chamber 38, and passage 36. An auxiliary valve 118 is biased closed on seat 112 by a spring 120 and has a stem 122 connected to the plunger 124 of a solenoid 126. Electrical leads 128 and 130 are connected to the ends of the winding of solenoid 126. The auxiliary valve 118 is opened when the winding of solenoid 126 is energized and closes when the solenoid is de-energized.

A pressure regulator variably biased by a solenoid actuator is generally indicated at 132 and includes a valve 134 cooperating with seat 102 in chamber 104. The valve 134 is formed as an integral central portion of a flexible diaphragm 136. Diaphragm 136 is clamped at its periphery between body 30 and the lower inverted cup portion 138 of a member generally indicated at 140 which is suitably attached to body 30. Member 140 further includes an upwardly extending, hollow, cylindrical portion 142 having a closed upper end with an axial bore 144 therethrough.

A vertically arranged, thin-walled, plunger guide sleeve 146 has its lower end fitted over a reduced diameter portion of the upper end of cylindrical portion 142 and has its upper end fitted into the lower portion of an axial bore 148 extending through the upper closed end of an inverted cup-shaped cover member 150. Cover member 150 is detachably connected at its lower open end in any suitable manner as by screws to the body member 30. The upper end portion of the bore 148 is screw threaded at 149 and threadedly receives an adjusting screw 152. A solenoid plunger 154 is slidably received in guide sleeve 146.

Plunger 154 has a screw-threaded axial bore therethrough which receives the upper screw-threaded end of a rod 156 in threaded engagement. The rod 156 extends downward through the plunger through the bore 144 into the hollow cylindrical portion 142 of member 140. The lower end of rod 156 is headed and a relatively strong spring 158 is interposed between the headed lower end of rod 156 and the valve 134. A relatively light spring 160 is interposed between the upper end of plunger 154 and the adjustment screw 152.

A spool 162 having a solenoid winding 163 thereon is slipped over the plunger guide sleeve 146 and cylindrical portion 142 of member 140, and a spring 164 holds the spool and winding in position with a considerable portion of the guide sleeve and plunger extending above the winding. The member 140 and plunger 154 are constructed of magnetic material, but cover member 150 as well as the plunger guide sleeve 146 are constructed of non-magnetic material so that a considerable portion of the magnetic flux path extends through air.

In this arrangement, flux density and magnetomotive force vary more gradually at a relatively low rate with variation in current flow through the solenoid winding. On the other hand, if a complete flux path of high permeability were instead provided, the rate of increase in flux density and magnetomotive force with relation to current increase would be so great that controlling this force by current change would be extremely critical. Moreover, beyond an earlier point of saturation of a highly permeable flux path, the rate of increase in force would drop precipitously to substantially nil. A non-magnetic disc 166 is included between the lower end of plunger 154 and the top of the member 140 to prevent sticking of the plunger due to residual magnetism. Circuit leads 168 and 170 are connected to the opposite ends of solenoid winding 163.

OPERATION OF THE MANIFOLD GAS VALVE

The manifold valve device 28 is shown in FIG. 1 in an "on" position with the hollow plug valve positioned so that gas may flow through its main port 64 to passage 44 and through its pilot port 70 to pilot burner 22. Also, pilot burner 22 is burning and safety cutoff valve 50 is being held open by electromagnet 58. However, solenoid 126 is not energized, so that auxiliary valve 118 is closed, thereby cutting off communication between inlet 32 and lower main diaphragm chamber 88. Since diaphragm chamber 88 is constantly vented through orifice 110 to outlet passage 48, the diaphragm 92 is in a lower relaxed position and main valve 78 is biased closed.

Under these conditions, when the water temperature drops any amount below a preselected temperature to be maintained, the winding of solenoid 126 is energized and auxiliary control valve 118 opens, providing communication between inlet 32 and lower diaphragm chamber 88 through orifice 114. The constant vent orifice 110 is considerably smaller than orifice 114 so that the pressure in chamber 88 now increases, causing diaphragm 92 to flex upward and move valve 78 openward against spring 86. The amount which valve 78 opens is determined by the rate of pressure bleed-off through the pressure regulator valve seat 102 which, in turn, is determined by the downward biasing force applied to regulator valve 134, either by the lighter spring 160 or by the solenoid plunger 154 acting through stronger spring 158.

Inasmuch as the lower side of regulator diaphragm 136 is in communication with outlet passage 48, it regulates the gas pressure applied to the metering orifice of burner 20. If supply pressure at inlet 32 increases for any reason, main valve 78 will open further, resulting in a higher pressure in outlet passage 48 and at the burner metering orifice. This pressure increase in outlet 48 causes regulator valve 134 to open further, thereby bleeding off the pressure increase at inlet 32 so as to restore the pressure at the burner metering orifice. The minimum regulator bias and therefore the minimum regulated flow of gas to the burner is determined by the relatively light spring 160, which is adjustable by turning screw 152. When the water temperature selected to be maintained is restored as a result of burner operation, auxiliary valve 118 closes thereby cutting off fuel flow to the main burner.

If the water temperature in outlet conduit 14 drops a predetermined amount below the preselected water temperature to be maintained, due to large draw-off, sufficient current is caused to flow through solenoid winding 163 to move solenoid plunger 154 downward, thereby compressing spring 158 and increasing the closing bias on regulator valve 134. This reduces the pressure bleed off and causes main valve 78 to open further to supply gas at a greater rate to burner 20. The threaded engagement of the upper end of pin 156 in plunger 154 provides an adjustable connection between plunger 154 and the stronger biasing spring 158.

DESCRIPTION OF ELECTRICAL CIRCUIT

Referring to FIG. 1, terminals 172–174 are to be connected to a source of alternating current. The electrically operated circulating pump 18 in bypass 16 is connected across these terminals through a triac 176 by leads 178, 180, and 182. A photoconductive cell 184 connected between the control electrode of triac 176 and the anode side thereof functions to gate the triac when an adjacent filament lamp 186 is energized. A transformer 188 has its primary winding 190 connected across terminals 172–174 in parallel with the circulating pump 18. The filament lamp 186 is connected across the secondary winding 192 of the transformer through a manual switch 194 by leads 196, 198, and 200. Therefore, whenever manual switch 194 is closed, filament lamp 186 is energized, triac 176 is conducting, and circulating pump 18 is operating.

The winding of the solenoid 126, which operates auxiliary valve 118, has one end thereof connected to one side of transformer secondary 192 through the lead 130, a resistor 202, an SCR 204, a lead 206, a lead 208, the lead 196, switch 194, and lead 200. The other end of the winding of solenoid 126 is connected to the other side of secondary 192 through the lead 128, a lead 210, a high temperature limit switch 212 on the water heater 10, a lead 214, and the lead 198. Therefore, when manual switch 194 is closed and SCR 204 is conducting, the biased closed auxiliary control valve 118 is opened. The high temperature limit switch 212 is always closed except when the water temperature exceeds a predetermined high limit.

The control of SCR 204 conduction, and, therefore, the operation of valve 118 in accordance with the temperature of the water in outlet conduit 14, is accomplished in the following manner.

The control electrode of SCR 204 is connected to the anode side at junction 226 through a resistor 216, a lead 218, a lead 220, a resistor 222, and a diode 224.

The control electrode of SCR 204 is also connected to the cathode side at junction 234 through a PNP transistor 228, a lead 230, and a lead 232. When the base of transistor 228 is forwardly biased, it conducts and shunts the application of a firing signal which would otherwise be applied to SCR 204 through resistor 216.

The base of transistor 228 is connected to the collector of a PNP transistor 236 through a lead 238 and resistor 240 and to junction 234 through lead 238, a resistor 241, and the lead 232. When transistor 236 is not conducting, the base of transistor 228 is forwardly biased through resistor 241.

The base and emitter of transistor 236 are connected, respectively, at junctions 242 and 244 to opposite sides of a Wheatstone bridge. One side of this bridge circuit extends from a junction 246 with the lead 220 to a junction 248 with the lead 232 and has an upper arm comprising a lead 250, a thermistor T, and a lead 252, and a lower arm comprising a pair of series connected variable resistors 254 and 256. The other side of this bridge circuit extends from a junction 258 with the lead 220 to a junction 260 with lead 232 and has an upper arm comprising a resistor 262 and a lower arm comprising a resistor 264. The current flow through the bridge is unidirectional due to the diode 224 in lead 220.

Thermistor T has a negative coefficient of resistance and is positioned in the outlet conduit 14 of the water heater 10 in good heat conducting relationship with the outlet water. The mass of thermistor T is very small, weighing only a few grains, and its resistance changes quickly and substantially in response to even slight changes in water temperature. The resistances of the described bridge are balanced with the outlet water to which the thermistor T is responsive has a predetermined temperature. Under these conditions, the voltages at junctions 242 and 244 are equal and transistor 236 is not conducting. When the water temperature drops below the predetermined temperature, the resistance of thermistor T increases, causing a voltage drop at junction 242 with respect to junction 244 whereby the base of PNP transistor 236 becomes negative with respect to its emitter and the transistor conducts.

The relative values of resistors 240 and 241 are such that conduction through transistor 236 reverse biases the transistor 228 and cuts off its conduction. When conduction through transistor 228 is cut off, a firing signal is applied to SCR 204 through resistor 216 and solenoid 126 is energized, causing auxiliary valve 118 to be opened. Opening of valve 118 effects an initial partial opening of main valve 78 and a minimum flow of gas to burner 20 as predetermined by the minimum biased condition of pressure regulator valve 132. The solenoid 126 operates on the half wave current flow through SCR 204, and there is a capacitor 225 connected in parallel with solenoid 126 to provide a carry-over during the half cycle SCR 204 is not conducting.

The winding 163 of the biasing solenoid has one end connected to one side of transformer secondary 192 at junction 226, through lead 170, lead 220, and diode 224. The other end of winding 163 is connected to the other side of transformer secondary 192 at junction 234, through lead 168, through the collector-emitter circuit of an NPN transistor 266 and a parallel resistor 269, a resistor 268, an SCR 270, and leads 272 and 232. Winding 163 is energized by the half wave current flow through SCR 270, and there is a capacitor 271 connected in parallel with the winding 163 to provide a carry-over during the half cycle SCR 270 is not conducting. Gating means for SCR 270 comprises a resistor 274 connected between its control electrode and anode side and a capacitor 276 connected between the electrode and cathode side. Resistor 274 and capacitor 276 are connected in parallel with the resistor 216 and transistor 228 between a junction 221 and the junction 234. A Zener diode 278 connected between the control electrode of SCR 270 and a point 280 between resistor 274 and capacitor 276 breaks down and fires SCR 270 when capacitor 276 becomes sufficiently charged through resistor 274.

The R-C time constants of the circuit are such that there is a predetermined delay in sufficiently charging capacitor 276 and firing SCR 270 following the initial closing of manual switch 194. However, after capacitor 276 once becomes sufficiently charged to effect conduction through Zener diode 278, it will remain so charged so long as manual switch 194 remains closed.

When conduction through SCR 270 occurs, current is permitted to flow through regulator biasing solenoid winding 163. It will be seen therefore that any current flow through winding 163 is delayed for a predetermined period of time following the closing of manual switch 194 and, consequently, following the firing of SCR 204 and the opening of valve 118, which will occur simultaneously with the closing of the manual switch if the water is cold. This feature is provided to preclude a substantial increase in regulator bias and the consequent immediate large flow of gas to the burner upon starting burner operation under conditions in which the outlet water temperature is low enough to require high output operation of the burner.

When SCR 270 fires after the predetermined delay, it will continue to fire each conductive half cycle thereafter, and a minimum current flow will pass through winding 163 as permitted by series resistors 269 and 268. When the water temperature drops a predetermined amount below that selected to be maintained, the current flow through winding 163 will vary directly with the resistance of thermistor T and the conduction through transistor 266 and inversely with the water temperature in outlet conduit 14. The base of NPN transistor 266 is connected to the collector of PNP transistor 236 via an intermediate amplifying NPN transistor 267. As the resistance of thermistor T increases with decreasing water temperature, the emitter of PNP transistor 236 becomes progressively more positive with respect to its base and the current flow therethrough progressively increases. As a result, current flow through transistor 266 and winding 163 increases with decreasing water temperature.

A filtering network including a capacitor 282 and a resistor 284 filters the a.c. supply rectified by diode 224 and the resistor 222 reduces this filtered d.c. supply, which is applied to the described bridge circuit at junctions 246 and 258 and to the gating means for SCR 204 and 270 at junction 221. A Zener diode 286 is provided to limit the voltage of this filtered d.c. supply.

The bridge circuit is adjusted by varying the resistance at 254 and 256 to balance the bridge at some preselected outlet water temperature to be maintained. When the water temperature drops below this preselected temperature even a fraction of 1° F., the SCR 204 will be fired, thereby energizing the winding of solenoid 126 and causing valve 118 to open. Opening of auxiliary valve 118 will cause main valve 78 to open partially to supply gas at a predetermined minimum rate corresponding to the minimum regulator bias. If the drop in water temperature is not greater than some preselected amount (in the order of 8° F.), the burner will operate at this predetermined minimum input to restore the preselected water temperature even though SCR 270 is conducting and some current is flowing through winding 163 of the biasing solenoid. This amount of current flow is limited by the relatively high resistance 269 and is insufficient to appreciably affect the regulator bias.

The voltage drop across bridge junctions 244 and 242 required to forwardly bias transistor 266 via transistor 267 and effect a conduction through the collector-emitter circuit of transistor 266, which would appreciably increase the regulator bias, is considerably greater than that required to reverse bias the shunting transistor 228. The burner is operated, therefore, in an "on" and "off" manner at a constant minimum input through an initial range of water temperature decrease extending, for example, through an 8° F. decrease. As the water temperature drops beyond this initial range, the closing bias applied to regulator valve 134 will progressively increase to a maximum through a range of greater temperature drop.

In the system described, the resistance change to temperature change in the transistor and the means for amplifying this change are such as to effect substantially instantaneous operation of the burner in response to a fraction of 1° F. drop in water temperature. This sensitivity is essential to closely maintain a predetermined water temperature in instantaneous type water heaters by "on" and "off" operation at constant input when the water temperature drop due to draw-off is relatively small. However, when it is desired to also modulate the fuel flow rate to the burner with water temperature drop through a greater range, modification of the amplifying means is required lest the range of modulation be unduly limited.

The resistor 268, connected in series with the collector-emitter circuit of the final stage amplifying transistor 266, is provided to progressively retard the increase in current flow through solenoid winding 163 as the voltage drop across bridge junctions 244 and 242 increases. As conduction through transistor 266 increases, the voltage drop across resistor 268 increases and the voltage drop across the transistor collector-emitter circuit decreases. Decreasing voltage drop across the collector-emitter circuit opposes increasing forward biasing of transistor 266, whereby the range of current flow through solenoid winding 163 and consequent regulator bias is extended through a greater range of water temperature decrease. The water temperature range through which the regulator bias and therefore fuel flow rate to the burner is varied may therefore be extended or reduced by varying the value of resistor 268.

One reason for designing the system so that it will operate to supply gas to the burner at some constant lower input rate through an initial range of water temperature drop is to prevent hunting. When the hot water draw-off rate is relatively low, the selected water temperature is satisfactorily maintained by "on" and "off" operation of the burner at some predetermined constant fuel input rate, provided burner operation is started and stopped substantially instantly in response to slight changes in water temperature.

I claim:

1. In a control system for a gas-fired water heater, a burner, a flow control device comprising a biased closed, fluid pressure-opened main valve controlling the flow of gas to said burner, a biased closed auxiliary valve controlling the application of operating pressure acting to move said main valve openward, electromagnetic means including a winding operative when energized to open said auxiliary valve, a variably biased pressure regulator operative to vary the operating pressure in accordance with the bias thereon, and a biasing solenoid operative to variably bias said pressure regulator in accordance with the rate of current flow through its winding; an electrical power source, a temperature variable resistor responsive to the temperature of the water being heated connected across said power source, first amplifying means operative to amplify resistance change in said resistor, first circuit means including switching means responsive to an initial slight amplified resistance change in said resistor to connect said electromagnetic winding across said power source, transistor amplifying means, second circuit means including the output of said transistor amplifier means connecting said solenoid winding across said power source, and means including the output of said first amplifying means operative to increase the forward bias of said transistor amplifier means with increasing change in the resistance of said resistor.

2. The control system claimed in claim 1 including means applying a constant predetermined minimum bias on said pressure regulator sufficient to result in the application of an operating pressure effective to partially open said main valve so as to admit an initial constant predetermined flow of gas to said burner whenever said auxiliary valve is open.

3. The control system claimed in claim 2 in which the output of said transistor amplifying means becomes sufficient to effect an appreciable increase in regulator bias only when a predetermined change in the resistance of said temperature variable resistor has occurred, whereby said burner is operated at said constant initial gas input through a predetermined initial range of water temperature change.

4. The control system claimed in claim 1 which further includes resistance means in said second circuit means operative to progressively oppose the forward biasing of said transistor amplifier means as its output increases, thereby to extend the range of water temperature change through which the bias on said regulator may be varied.

5. The control system claimed in claim 1 further including a main switch operative when closed to jointly connect said first and second circuit means across said power source, a controlled solid state switch in said second circuit means, and gating means for said solid state switch including resistance capacitance means operative to fire said switch a predetermined period of time following closure of said main switch.

6. The control system claimed in claim 5 in which said second circuit means includes resistance means connected in parallel with the output of said transistor amplifier, and said resistor being operative to maintain conduction of said solid state switch but inoperative to effect a change in bias of said pressure regulator.

7. The control system claimed in claim 1 in which said temperature variable resistor is a thermistor, which further includes a Wheatstone bridge connected across said power source and having said thermistor in one arm thereof and manually variable resistance means in another arm thereof for balancing said bridge when the resistance of said thermistor corresponds to a predetermined water temperature to be maintained, and in which said first amplifying means includes a transistor amplifier connected across said bridge so as to be forwardly biased by a slight increase in the resistance of said thermistor.

8. In control system for a gas-fired water heater, a burner, a source of gas under pressure, a flow control device including a biased closed valve operative to control the flow of gas to said burner, and a variably biased pressure regulator operative to vary the pressure of gas flowing to said burner in accordance with the bias thereon, electromagnetic means including a winding operative to open said valve when energized, a solenoid including a winding operative to vary the bias on said regulator in accordance with the rate of current flow through its winding, a temperature variable resistor responsive to the temperature of the water being heated, an electrical power source, circuit connections connecting said resistor across said power source, circuit connections including switching means rendered operative in response to a change in the resistance of said resistor to connect said electromagnetic winding across said power source, and circuit connections connecting said solenoid winding across said power source including the output of amplifying means operative in response to changes in the resistance of said resistor to vary the rate of current flow through said solenoid winding with variations in the potential across said resistor.

9. In a gas burner control system, a burner, normally closed electrically operated valve means controlling the flow of gas to said burner, first circuit means including switching means operative in response to a drop in temperature of a medium being heated by said burner to effect opening of said valve, a variably biased pressure regulator operative to vary the pressure of gas flowing to said burner in accordance with the bias thereon, electrically operated means operative to vary the bias on said regulator in accordance with the rate of current flow therethrough, a temperature variable resistor responsive to the temperature of the medium being heated by said burner, means connecting said resistor across a power source, second circuit means including amplifying means responsive to variations in the resistance of said resistor to vary the current flow through said electrically operated means, said second circuit means further including controlled solid state switching means, a main switch operative when closed to jointly connect said first and second circuit means across a power source, and gating means for said solid state switching means including resistance and capacitance means operative to effect conduction of said switching means a predetermined period of time after closure of said main switch.

10. The control system claimed in claim 9 in which said resistor is a thermistor having a negative coefficient of resistance, and in which said amplifying means includes a transistor amplifier arranged to be progressively forwardly biased with increasing voltage drop across said thermistor and arranged in said second circuit means so as to progressively increase the current flow through said electrically operated means.

11. The control system claimed in claim 10 in which said switching means in said first circuit means is a controlled solid state switch having gating means responsive to initial relatively slight conduction of said transistor.

12. The control system claimed in claim 10 including resistance means in said second circuit operative to progressively oppose the progressive forward biasing of said transistor, thereby to extend the range of temperature decrease through which the bias on said regulator and, therefore, gas pressure may be varied.

* * * * *